March 24, 1959
H. C. HUNT
2,878,912
MULTIPLE DRIVE TRANSMISSION UNIT
Filed March 21, 1957
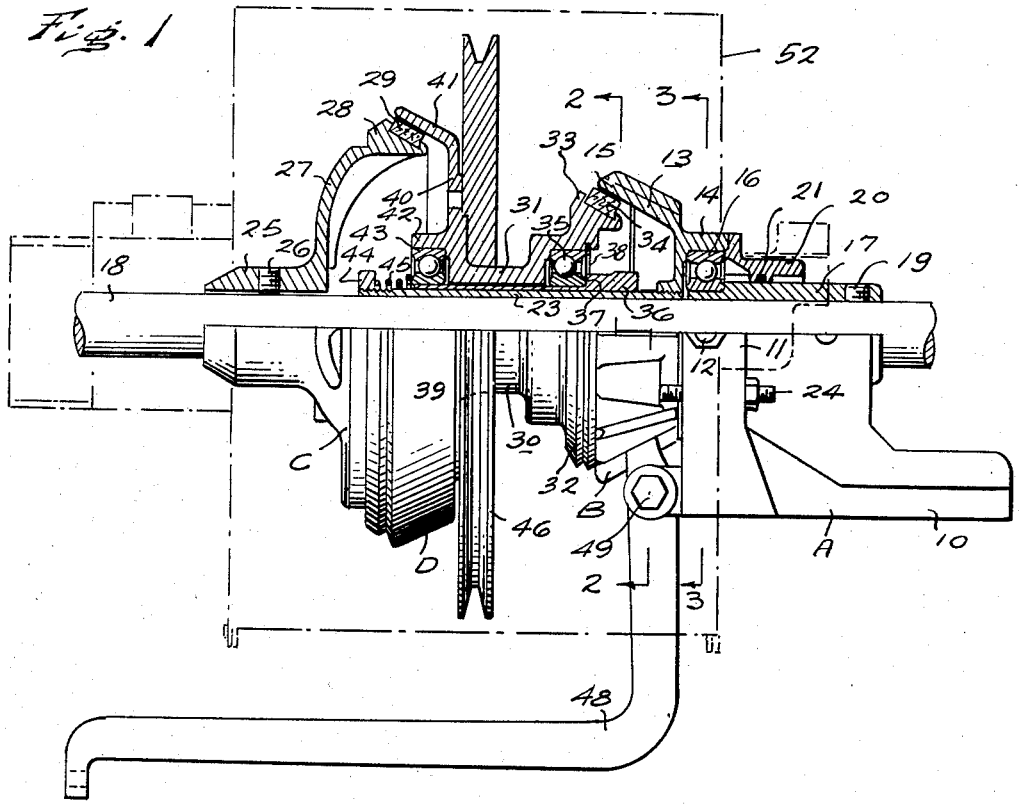
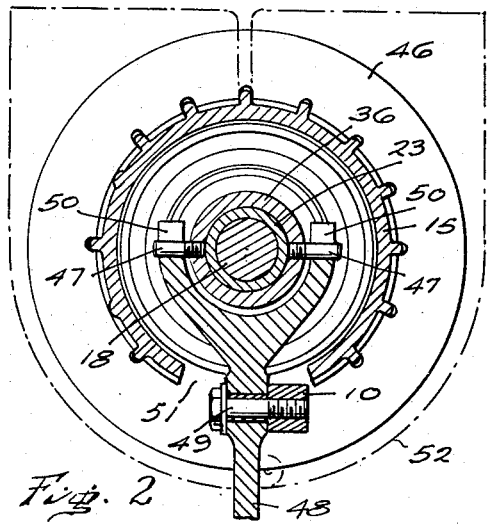
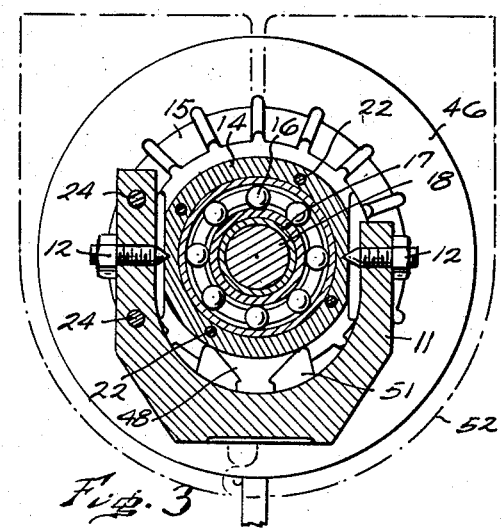
INVENTOR
HARRY C. HUNT
BY
ATTORNEY

United States Patent Office 2,878,912
Patented Mar. 24, 1959

2,878,912

MULTIPLE DRIVE TRANSMISSION UNIT

Harry C. Hunt, Reading, Pa., assignor to American Safety Table Company, Inc., Reading, Pa., a corporation of Pennsylvania Application March 21, 1957, Serial No. 647,559

6 Claims. (Cl. 192—18)

This invention relates generally to power transmission units and particularly to improvements in a type thereof utilized in the transmission of power from a line shaft to a battery of sewing machines.

United States Letters Patent No. 2,037,643, issued to M. T. Voigt, April 14, 1936, discloses the type of power transmission unit over which the present invention is an improvement. The unit comprises three axially spaced sections that are mounted upon a line shaft and which are provided with friction faces that are paired for coaction. The intermediate section is axially shiftable in opposite directions for selectively frictionally engaging the other sections. It is desired that coacting friction faces engage to the fullest extent, i. e., come into contact over the greatest possible area, but when the intermediate unit becomes cocked slightly to one side relative to the other sections, the friction faces only partially engage, thereby making both braking and pick-up actions sluggish. Accordingly, an important object of the present invention is to provide a power transmission unit of the type aforesaid wherein the intermediate section is effectively secured against tilting to either side relative to the other sections.

The difficulty encountered in setting the intermediate section in motion and in stopping the same increases as the speed of operation and/or the mass of the intermediate section increase. Therefore, to insure sufficiently rapid braking and pick-up action, the speed of operation of the line shaft is limited to approximately 1150 r.p.m., it being found that if this practical limit is exceeded, the braking and pick-up actions are unsatisfactory, and that the line shaft whips excessively. Accordingly, another important object of the present invention is to provide a power transmission unit of the type aforesaid adapted for use with a high speed line shaft without sacrifice of rapid braking action or rapid pick-up action, and without inducing excessive line shaft whipping.

Other objects and advantages of the present invention will appear more fully hereinafter, it being understood that the invention consists substantially in the combination, construction, location and relative arrangement of parts, all as described in detail hereinafter, as shown in the accompanying drawings and as finally pointed out in the appended claims.

In the accompanying drawings:

Figure 1 is a side elevation of a power transmission unit constructed in accordance with and embodying the principles of the present invention, with parts broken away in vertical section.

Figures 2 and 3 are vertical sections respectively on lines 2—2 and 3—3 of Figure 1.

The power transmission unit constructed in accordance with and embodying the principles of the present invention comprises a support A that has a horizontally extending base 10 which is fixed to a sewing machine table (not shown). Carried by the base 10 is an upright yoke 11 that is fitted with a pair of axially aligned pins 12—12 which carry a stationary section B of the unit. The latter includes main body part or annular element 13 that has a hub 14 and a brake flange 15. This brake flange flares axially and outwardly from the hub 14, which hub 14 is fitted with a ball bearing unit 16 that embraces one end portion of a sleeve 17 which is fitted over a line shaft 18 and secured against displacement by a set screw 19. Embracing the sleeve 17 is an annular collar 20 that is secured to the hub 14 by a plurality of screws 22. The hub 14 is also fitted with a sleeve 23 that embraces the line shaft 18 for rotation of the latter relative thereto. The yoke 11 is fitted with a pair of bolts 24—24 that bear upon the annular element 13 and thereby secure the stationary section B against pivotal movement about the axis of the pins 12—12.

Mounted upon the line shaft 18, in axially spaced relation to the stationary section B, is a driving section C, which latter is in the form of a wheel including a hub 25 that is secured to the line shaft 18 by a set screw 26 and a web 27 that extends radially from the hub 25, a flange 28 and a flange facing 29.

Intervening the stationary section B and the driving section C is a driven section D. The latter includes an elongated element 30 in the form of axially spaced wheel-like formations that are interconnected by a cylindrical neck 31. One of these formations, designated 32, proximate the brake flange 15, has an annular flange 33 that is fitted with a facing 34. Housed by the formation 32 is a ball bearing unit 35 that embraces a sleeve 36 which is slidably fitted over the sleeve 23. Adjacent the inner race of the ball bearing unit 35 is a circumferentially extending shoulder 37 that is formed by an enlarged diameter terminal portion of the sleeve 36, and adjacent the upper race of the ball bearing unit 35 is a retainer ring 38.

The other formation, designated 39, has a web 40 that extends radially from the cylindrical neck 31, and a flange 41. The latter flares axially and outwardly from the web 40, which web 40 is provided with a circumferentially extending rib 42. This rib houses a second ball bearing unit, designated 43, that embraces the sleeve 36. Fitted over the end of the sleeve 23 is a ring 44, and intervening the ring 44 and the ball bearing unit 43 is a coil spring 45 acting to bias the driven section D toward the stationary section B.

Fitted over the cylindrical neck 31 and side abutting the web 40 is a split pulley 46 that is mounted to rotate with the elongated element 30.

Projecting outwardly in opposite directions from diametrically opposite sides of the enlarged diameter portion of the sleeve 36 are a pair of pins 47—47. These pins engage the bifurcated upper end portion of a lever 48 that is carried by the support A, being pivoted, as at 49. The furcations 50—50 of the lever 48 extend freely about the sleeve 36, and the brake flange 15 is split, as at 51 to thereby accommodate the lever 48, which latter extends freely downwardly from the pivot 49 through a guard 52, shown in broken lines.

In the operation of the power transmitting unit, the line shaft 18 normally is rotating, and the coil spring 45 operates to bias the driven section D into engagement with the stationary section B, in consequence of which the facing 34 engages the brake flange 15 and the driven section D is thereby frictionally secured against rotation. In this condition of the apparatus, the table mounted sewing machine (not shown), operatively connected to the power transmitting unit by a belt trained over the pulley 46, is at rest. To operate the sewing machine, the treadle connected to lever 48 is depressed, whereupon the lever 48 pivots about the element 49, and the bifurcated end thereof acts through the pins 47—47 to shift the driven section D axially, against the influence of the coil spring 45, into engagement with the driving section C, in consequence of which the facing 29 engages the flange 41 of the formation 39 and the driven section D is thereby frictionally secured to the driving section C for rotation therewith.

It will be observed that the driven section D is rather elongated and provided at opposite ends with roller bearing units to prevent tilting to either side, in consequence of which the coacting friction faces make good contact over a maximum area. In addition, it will be observed that the arrangement inherently lends itself to the use of a very small diameter pulley 46, in consequence of which the mass of the driven clutch section D is materially reduced, which makes it possible to operate the line shaft at high speed without sacrificing rapid braking and pick-up action and without inducing excessive whipping of the line shaft.

It will be understood, of course, that the present invention as hereinbefore described and as shown in the accompanying drawings is susceptible of various changes and modifications which may be made from time to time without departing from the general principles of real spirit of the invention, and accordingly it is intended to claim the same broadly, as well as specifically, as indicated by the appended claims.

What is claimed as new and useful is:

1. In a unit for transmitting power from a continuously operating line shaft to a work utility for intermittent operation of the latter, a stationary section including a main body adapted for extending about the line shaft, and an elongated cylindrical sleeve extending axially from said main body part and adapted for rotation of the line shaft therein, a driving section including a wheel adapted for being mounted upon the line shaft to rotate therewith, an elongated driven section interposed between said stationary and driving sections including opposite end wheel-like formations, an elongated cylindrical neck interconnecting said wheel-like formations, and belt pulley means extending about said driven section, said neck closely embracing and said driven section being axially shiftable upon said sleeve, and means for shifting said driven section axially upon said sleeve for engagement of rim portions of said wheel-like formations respectively with the main body part of said stationary section to brake the unit or optionally for frictional engagement with said driving section to rotate said driving and driven sections together and to transmit power from said pulley means to the work utility.

2. In a unit for transmitting power from a continuously operating line shaft to a work utility for intermittent operation of the latter, a stationary section including a main body adapted for extending about the line shaft, and an elongated cylindrical sleeve extending axially from said main body part and adapted for rotation of the line shaft therein, a driving section including a wheel adapted for being mounted upon the line shaft to rotate therewith, an elongated driven section interposed between said stationary and driving section including a sleeve fitted over said stationary sleeve and axially shiftable relative thereto, a pair of axially spaced anti-friction units mounted upon said axially shiftable sleeve, an elongated element carried by said anti-friction units for rotation relative to said axially shiftable sleeve and for axial shifting movement therewith, said elongated element having opposite end wheel-like formations, and an elongated cylindrical neck interconnecting said wheel-like formations, and a belt pulley extending about said elongated element and mounted for movement therewith, and means for securing said axially shiftable sleeve against rotation and shifting said axially shiftable sleeve and anti-friction units, elongated element and pulley axially as a unit upon said stationary sleeve for engagement of rim portions of said wheel-like formations respectively with the main body part of said stationary section to brake the unit or optionally for frictional engagement with said driving section to rotate said driving and driven sections together and to transmit power from said belt pulley to the work utility.

3. In a power transmission unit as defined in claim 2 wherein the neck of the elongated element is disposed between the anti-friction units and in closely embracing relation to the axially shiftable sleeve.

4. In a power transmission unit as defined in claim 2 wherein the anti-friction units are in the form of ball bearing units, the neck of the elongated element is disposed between said ball bearing units and in closely embracing relation to the axially shiftable sleeve, and said ball bearing units are housed respectively in the wheel-like formations interconnected by said elongated neck.

5. In a power transmission unit as defined in claim 2 wherein the anti-friction units are in the form of ball bearing units, the neck of the elongated element closely embraces the axially shiftable sleeve, the wheel-like formations have web portion extending radially outwardly from said elongated neck, and annular elements extending axially from said webs respectively toward said driving and stationary sections in radially spaced relation to the axially shiftable sleeve, said ball bearing units are disposed respectively within the annular spaces between said annular elements and axially shiftable sleeve and in abutting relation to said webs.

6. In a power transmission unit as defined in claim 2 wherein the neck of the elongated element is disposed between the anti-friction units and in closely embracing relation to the axially shiftable sleeve, and the belt pulley is disposed in embracing relation to said elongated neck.

References Cited in the file of this patent

UNITED STATES PATENTS

| | | |
|---|---|---|
| 1,295,242 | Waite | Feb. 25, 1919 |
| 1,382,133 | Spencer et al. | June 21, 1921 |
| 1,431,198 | Voigt | Oct. 10, 1922 |
| 1,444,573 | Voigt | Feb. 6, 1923 |
| 2,501,183 | Marantz | Mar. 21, 1950 |